United States Patent [19]
Keilholz

[11] 3,958,672
[45] May 25, 1976

[54] SHOCK ABSORBER VALVE CONSTRUCTION

[75] Inventor: Friedrich Keilholz, Ennepetal, Germany

[73] Assignee: Firma August Bilstein, Ennepetal, Germany

[22] Filed: Aug. 8, 1974

[21] Appl. No.: 495,549

[30] Foreign Application Priority Data
Aug. 14, 1973 Germany............................ 2340987

[52] U.S. Cl................................ 188/277; 236/101 R
[51] Int. Cl.²........................................... F16F 9/52
[58] Field of Search.................... 188/276, 277, 322; 236/93 R, 93 A, 101 R, 102; 137/46 B

[56] References Cited
UNITED STATES PATENTS

| | | | |
|---|---|---|---|
| 2,821,268 | 1/1958 | De Carbon | 188/277 |
| 3,076,529 | 2/1963 | Zeidler | 188/277 |
| 3,078,965 | 2/1963 | De Carbon et al. | 188/322 X |
| 3,088,556 | 5/1963 | De Carbon | 188/322 X |
| 3,621,951 | 11/1971 | Schmid | 188/277 X |
| 3,674,120 | 7/1972 | Johnson | 188/277 |

*Primary Examiner*—Trygve M. Blix
*Assistant Examiner*—Edward R. Kazenske
*Attorney, Agent, or Firm*—Neuman, Williams, Anderson & Olson

[57] ABSTRACT

A hydropneumatic shock absorber for use with a motor vehicle or the like has disposed therein a valve, which is movable in the normal course of operation relative to a fluid passage. A heat sensitive element sensitive to the temperature of a damping fluid, such as oil, of the shock absorber is connected to the valve whereby the valve is urged from flow-preventing engagement with the passage after a predetermined damping fluid temperature is reached. Thus the provided valve permits increased damping fluid movement through the passage with temperatures in excess of the predetermined temperature.

6 Claims, 5 Drawing Figures

SHOCK ABSORBER VALVE CONSTRUCTION

The invention relates to a shock absorber valve and more particularly to a piston equipped with such valve for hydropneumatic, motor vehicle, single-tube shock absorbers. In the provided shock absorbers, the valve is provided with a valve element movable with respect to valve seat for controlling damping fluid passage. The valve also functions in conjunction with a heat expansion element as will be hereinafter explained in greater detail.

In known shock absorber valves of the aforementioned type a heat expansion element constructed in bar or tube form, and frequently consisting of a suitable plastic, serves for the compensation of the temperature-caused viscosity changes of the damping fluid, such as of damping oil. The heat expansion elements are constructed and arranged throughout in such a way that their expansion taking place with the temperature increases presses the valve elements such as, for example, centrally mounted valve spring disks stressed for bending or valve plates slidable against spring pressure, more strongly against a valve seat. In this manner the intermediately situated damping fluid passage is diminished during the damping operation, simultaneously generating a correspondingly greater fluid "choking" in order to compensate for the damping decrease caused by the greater fluidity of the damping oil at the elevated temperature.

In accordance with this invention, shock absorbers, especially those of hydropneumatic single-tube construction, are protected against temporary overloads, such as arise, for example, in the traversing by a vehicle of a very bad stretch of road, through overheating of the shock absorbers. In pressureless two-tube shock absorbers such thermal overloads are hardly possible, since these shock absorbers in the case of overloads or on reaching certain temperatures, the fluid therein begins to foam. As a result the damping performance abates and the temperature of the damping fluid does not exceed a certain limit value.

In the case of single-tube hydropneumatic shock absorbers containing a pressurized gas and fluid such as oil or other suitable liquid, however, even at high stresses such a foaming of the damping oil does not occur so that the damping force remains preserved and the temperature of the damping fluid continues to rise. This can lead to harmful effects on the damping fluid as well as on the seals and packing employed in the shock absorber. Thus even short periods of overload may substantially shorten the life of such a hydropneumatic shock absorber.

It is an object of this invention, therefore, to prevent such heat-generated damage caused by brief overloads in motor vehicle shock absorbers, especially hydropneumatic single-tube shock absorbers, by appropriate construction of the shock absorber valves. This problem is solved utilizing a shock absorber valve of the type mentioned above, according to this invention, by allowing a heat expansion element to function as a thermal overload switch whereby exceeding a certain damping fluid temperature results in shifting of the valve element in the direction of increasing damping fluid passage or reduction of the absorber damping action. In this manner it is possible to effectively protect the shock absorber against brief overstrains which could lead to thermal overload of the shock absorber as the fluid damping action is temporarily correspondingly reduced; thus a further temperature rise in the damping fluid is avoided.

A shock absorber piston of known construction equipped with the new shock absorber valve, employs known structural features comprising substantially axially parallel fluid passage channels and centrally mounted valve spring plates, arranged on the opposed piston faces and at least partially covering the fluid passage channels. In accordance with this invention, at least one heat expansion element in bar form is accommodated in a corresponding co-axial bore of the piston and is capable of pressing directly or indirectly against a valve spring plate lying on the piston face surface concerned. Such a shock absorber piston, despite the built-in heat expansion element, is of extremely simple and conventional construction. Also, with this arrangement of the heat expansion element, the latter can conveniently be installed in conventional shock absorber pistons without the necessity of reconstructing other shock absorber parts.

Preferably the heat expansion bar consists of a heat-expansible plastic and is covered at one end by a small metal plate laid in the bore of the shock absorber over one end of the plastic element. On sufficient heat expansion of the plastic bar the plate travels partially out of the bore and thereby bends the valve spring plates from their valve seat on the adjacent piston face surface a sufficient distance so that there occurs a corresponding enlargement of the damping fluid aperture cross-section whereby a corresponding decrease of the damping force is effected.

It has been found, therefore, that effective thermal overload protection of shock absorbers can be achieved by employing heat expandable bars which engage valve spring plates active in the compression stroke of the shock absorber piston. However, in responding to thermal overload, not only is pressure stage damping reduced, but also the damping force in the draft stage is reduced since the valves of this invention remain open in each case whether the absorber is reducing a shock in which the piston is moved into a cylinder or retracted therefrom.

The thermal overload safeguard for shock absorbers according to this invention is characterized by its simplicity, the small space requirement and further by the ease of installing the heat expansion element or elements in existing shock absorber pistons without the necessity of structural change which might alter their precision, damping adjustment in the normal range and the like.

In the drawing there are represented several embodiments of the invention, namely FIG. 1 shows the partially sectioned plan view of a shock absorber piston equipped with the new overload safeguard;

Figure 1:
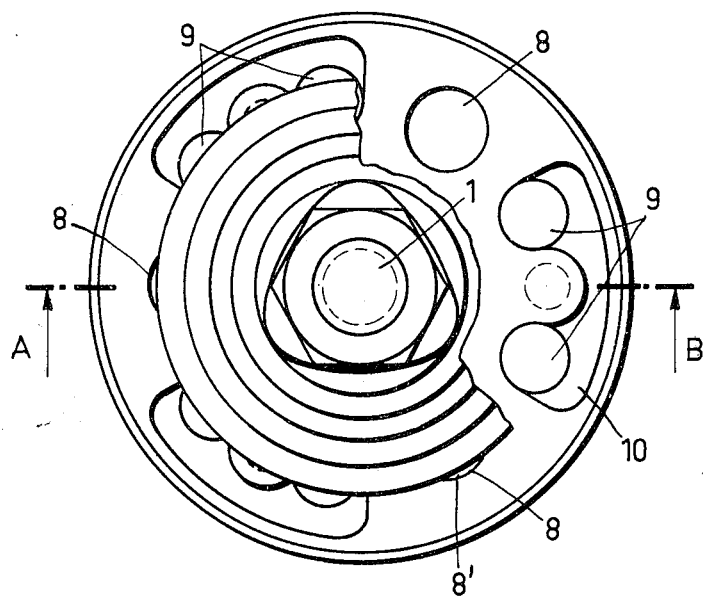
Figure 2:
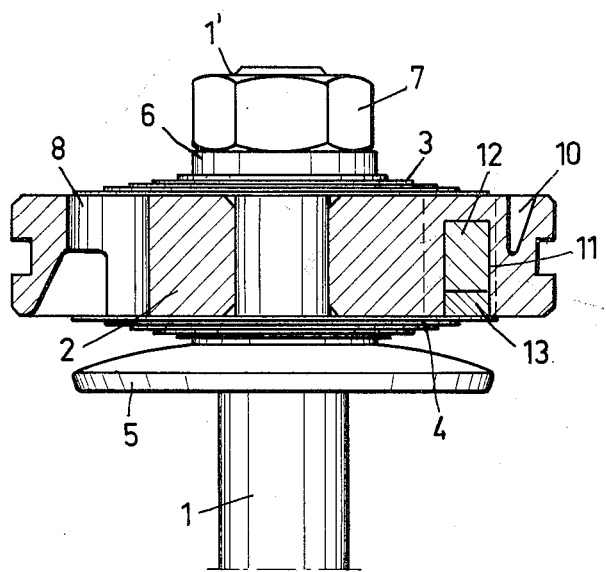
FIG. 2 is a section along the line A–B of FIG. 1.

The shock absorber piston represented in FIGS. 1 and 2 is designed for hydropneumatic, motor vehicle, single-tube dampers. It is arranged at the inner end of the piston rod 1. It consists essentially of the piston body 2 and the valve spring plate packs 3 and 4 arranged on opposed piston faces which together with the plate supporting disc 5 and the essentially triangular element 6 are screwed by means of the nut 7 on the piston rod end provided with corresponding threads 1'.

In the piston body 2 there are uniformly distributed, relative to the piston center, three fluid passage channels 8 which are effective during the draft damping stage. Three channel pairs 9 are similarly provided. The channels 9 are traversed by the damping fluid during the pressure damping stage. To each channel pair 9 there is allocated a kidney-shaped inflow pocket 10. As is shown especially in FIG. 1 the spring plates 3 largely cover the channels 8 through which damping fluid passes during the draft stage, i.e. with the exception of the small permanent passages 8', shown as substantially sickle-shaped, while the valve spring plates 4 cover the piston channel pairs 9 active during the pressure stage.

Between each channel pair 9 there is provided a pocket bore 11 which is drilled from the lower face of the piston as viewed in FIG. 2, which face is oppositely disposed to that having the kidney-shaped inflow pocket 10. Into each of these bores there is inserted a heat expansion bar 12 consisting preferably of thermally expansible plastic; each bar is covered by a metal plate 13. The heat expansion bars 12 and their metal plates 13 are formed and dimensiond in such a way that during the normal damping work they are disposed in the bores 11 and, therefore, do not lie against the lower valve spring plate pack 4. However, as soon as the damping fluid temperature exceeds a certain predetermined maximum value, as can be the case for example, in traveling over an especially bad stretch of road, then the bars 12 expand correspondingly whereby the metal plates 13 move partially out of their bores 11 and thereby bend the valve spring plates 4, (which like the upper valve spring plates 3 are centrally mounted) away from the lower piston face surface. Thereby not only is the pressure stage damping correspondingly reduced, but simultaneously also the draft stage damping, since during the individual draft stage phases the pressure stage valves are bent off or lifted off their valve seats. Thereby the damping force during the inward and outward movements of the piston rod 1 are similarly decreased so that temporarily less movement energy is dissipated and, therefore, a further temperature rise which could lead to damage to the damper is avoided with certainty.

It is obvious that within the scope of this invention many modifications are possible. For example, the heat expansion element acting as a thermal overload switch can also be used in other valve systems, such as those with valve plates, valve cones or valve balls supported by spiral springs, with like success. In these cases, therefore, with a correspondingly strong temperature rise the heat expansion element can likewise lift off the valve plate or the valve cone from the valve seat in order to thereby achieve a corresponding weakening of the choking or damping effected by the shock absorber.

Figure 3:
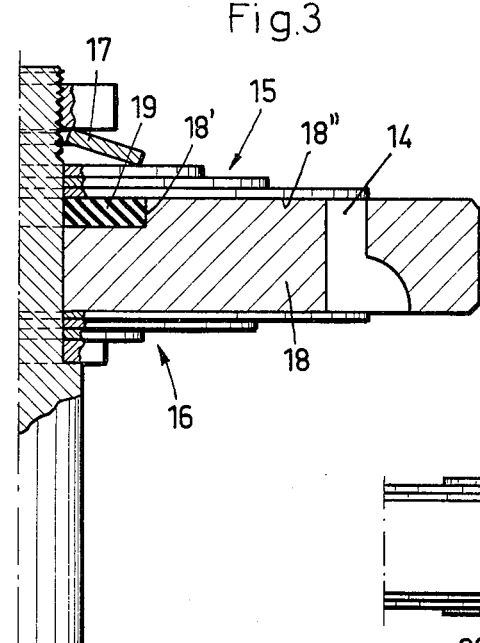
FIG. 3 is a partially sectioned view of a shock absorber piston of another embodiment provided with valve spring plates.

In the embodiment illustrated in FIG. 3 a shock absorber piston which is depicted, is provided with substantially axially parallel fluid passage channels 14 and valve spring plate packs 15 and 16 arranged on opposed piston faces and at least partially covering the channels 14. Plates 15 and 16 are mounted centrally as illustrated with a disc spring 17 positioned therebetween so that there is provided an axially yieldable clamping action for the valve spring plates 15 and 16. In an annular groove 18' in the piston body 18 there is inserted a heat expansion ring 19. As soon as the temperature of the damping fluid exceeds a certain maximum value, the valve spring plate pack 15 can be lifted off or deflected against the action of the disc spring 17 from the piston face surface 18''. Thereby, on the one hand, the characteristic of the valve spring plates 15 is altered in the sense of a lower damping force. It is obvious that the spring plates 16 situated on the other side of the piston body 18 can similarly be made into a thermal overload switch by a heat expansion ring 19.

Figure 4:
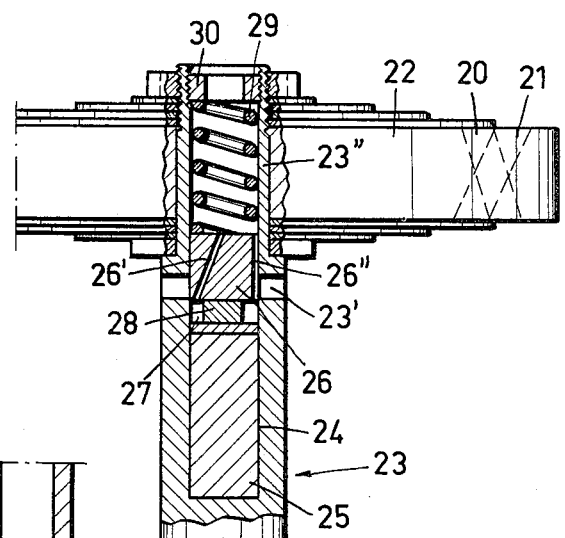
FIG. 4 is a shock absorber piston with thermal overload switch arranged in the zone of its piston rod.

The shock absorber piston represented in FIG. 4 is provided with a piston body 22 having fluid passage channels 20 and 21. The body 22 is fastened to the inner end 23' of the piston rod 23. The piston rod 23 is here provided in a known manner with a pocket bore 24, in which there is a further fluid passage channel interconnecting the working spaces lying on opposite sides of the piston body 22. Such passage is controlled by a slider valve 26 seated on the end of a heat expansion bar 25 accommodated in the hollow piston rod. According to this invention, this slider valve 26 is arranged in respect to the heat expansion bar 25 in such a way that it holds the fluid passage channel in the piston rod 23 normally closed or constricted, but frees it in the case of excessively high temperature of the damping fluid. For this purpose, the slider valve 26 is permanently connected with the heat expansion bar 25 by means of a valve neck 28 forming a fluid annular channel 27; neck 28 is also provided with a continuous longitudinal bore 26' branching off the fluid annular channel 27. In the hollow part of the piston rod 23 there are provided radial inflow bores 23' which are normally covered by the slider valve 26, but on excessive expansion of the heat expansion bar 25 they enter into fluid connection with the annular channel 27 surrounding the valve neck 28.

Through the spiral pressure spring 29 which is supported against the annular nut 30 screwed into the end of the piston rod 23, the valve unit 26, 28 and 25 can be pressed back in each case into its normal starting position. The heat expansion bar 25 advantageously consisting of plastic is regularly capable by itself of returning after cooling into its starting position without requiring corresponding spring return or guide means. In the embodiment of FIG. 4 the slider valve 26 is additionally provided with one or more permanent passage channels 26'' which form a constantly open bypass to the piston valve.

Figure 5:
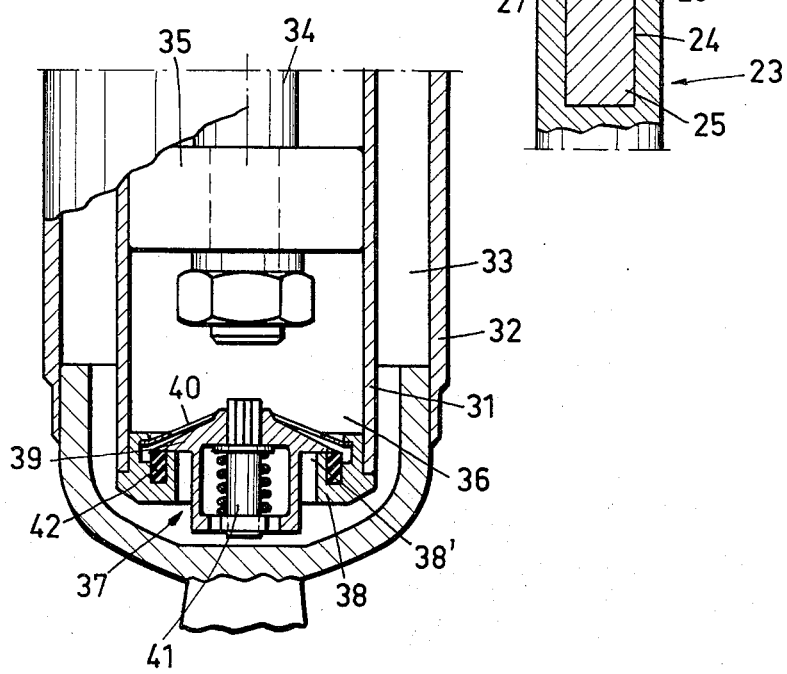
FIG. 5 is a section through a two-tube damper equipped with the overload valve.

Finally it is further shown in FIG. 5 that the thermal overload switch can theoretically also be used in two-tube shock absorbers. The two-tube shock absorber represented consists of the inner tube 31 and the outer tube 32 between which the annular chamber 33 serves for the reception of the fluid volume displaced by the entering piston rod 34. On the piston rod 34 there is mounted the piston 35 which is provided with corresponding fluid valves. Between the working chamber 36 and the annular chamber 33 there is arranged the characteristic base valve 37 usual for such two-tube dampers. Valve 37 consists of the base piece 38 inserted in the lower end of the inner tube 31 with the valve body 39 seated axially slidably in it, pressed by an annular spring 40 against valve seating surface 38' on the base piece 38.

In the interior of the valve body 39 there is also a valve tappet 41 which in the inward movement of the piston rod 34, opens the fluid passage controlled by it so that fluid can escape from the working chamber 36 into the annular chamber 33. Conversely, piston 35 in its outward movement allows passage of fluid from the annular chamber 33 into the working chamber 36. In order to also achieve a thermal overload protection in this embodiment there is installed in the base piece 38 a heat expansion element 42 consisting of plastic. This can consist, for example, of a heat expansion ring which can be provided on its upper edge facing the valve body 39 with notch-type liquid passages. If the damping fluid exceeds a certain temperature, the heat expansion ring 42 lifts the valve body 39 off valve seat surface 38' so that there arises here a damping fluid passage which results in a corresponding reduction of the base valve damping whereby a further rise of the damping fluid can be prevented also in this case.

Although FIG. 5 discloses the heat expansion ring 42 installed directly in the base valve, there can also be provided a special overload valve lying parallel to the base valve 37. Such overload valve would be disposed between the working chamber 36 and the annular chamber 33, which overload valve is controlled by a correspondingly constructed and arranged heat expansion element in the sense of the invention, i.e. on thermal overload it is opened and thereby brings about a drop of the damping force.

What is claimed is:

1. A hydropneumatic shock absorber for a motor vehicle or the like, comprising a damping piston movable within a tube containing damping fluid, said piston having fluid passages therethrough and spring-loaded valve means at least partially covering and restricting the fluid flow through said passages, at least one heat expandable element disposed in a pocket formed in said piston; said heat expandable element being in thermal contact with said damping fluid and arranged in such manner relative to said valve means, that during normal operation of said shock absorber with said damping fluid at a temperature within a desired range, said heat expandable element does not alter the relationship of said valve means relative to said fluid passages; said heat expandable element moving said valve means away from said covering relationship with said fluid passages to enable a greater and less restricted fluid flow through said passages when said damping fluid temperature exceeds the maximum temperature in said desired range.

2. The shock absorber of claim 1 in which said fluid passages are axially parallel and said valve means comprises spring plates arranged on opposite piston faces at least partially covering said passages, and said heat expandable element comprises at least one element in bar form disposed in said pocket of bore form which is axially parallel to the axis of said piston movement; said element in bar form being adapted to urge its free end in the direction of the adjacent valve spring plate lying on the piston face from which said element free end extends.

3. The shock absorber of claim 2 in which each heat expandable bar consists of thermally expandable plastic material and a metal plate inserted in the pocket bore; said metal plate on sufficient heat expansion of the plastic bar moving partially out of the bore and against the adjacent valve spring plate.

4. The shock absorber of claim 3 in which each heat expandable bar is in cooperative engagement with said valve spring plates effective in the pressure stage of the shock absorber piston movement.

5. The shock absorber of claim 2 in which said fluid passages are three groups of fluid flow channel pairs arranged uniformly circumferentially through said piston with damping fluid flowing therethrough during the pressure stage; each channel pair having a common inflow pocket and characterized in that between each channel pair there is provided said bore receiving said heat expansion bar; said bore being drilled into the piston body from the piston face surface lying away from the inflow pocket.

6. The shock absorber of claim 1 characterized in that said valve means comprises valve spring plates disposed on at least one piston face to axially yield relative to an interposed biasing means and be lifted by said heat expansion element which is placed in an annular groove made in the adjacent piston face surface against the action of the biasing means.

* * * * *